Figure 1:
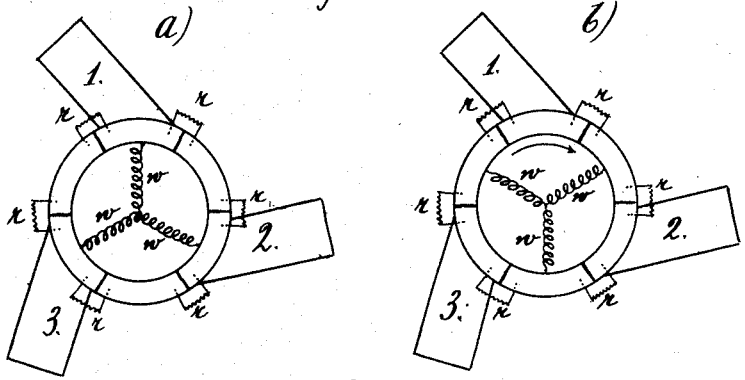

No. 882,682.  
PATENTED MAR. 24, 1908.

A. HEYLAND.

COMMUTATOR FOR POLYPHASE CURRENTS.

APPLICATION FILED JAN. 21, 1903.

5 SHEETS—SHEET 1.

Witnesses.  
Inventor  
Alexander Heyland  
by  
Attorneys.

No. 882,682. PATENTED MAR. 24, 1908.
A. HEYLAND.
COMMUTATOR FOR POLYPHASE CURRENTS.
APPLICATION FILED JAN. 21, 1903.

5 SHEETS—SHEET 2.

No. 882,682. PATENTED MAR. 24, 1908.
A. HEYLAND.
COMMUTATOR FOR POLYPHASE CURRENTS.
APPLICATION FILED JAN. 21, 1903.

5 SHEETS—SHEET 3.

No. 882,682.

PATENTED MAR. 24, 1908.

A. HEYLAND.
COMMUTATOR FOR POLYPHASE CURRENTS.
APPLICATION FILED JAN. 21, 1903.

5 SHEETS—SHEET 5.

UNITED STATES PATENT OFFICE.

ALEXANDER HEYLAND, OF BRUSSELS, BELGIUM.

COMMUTATOR FOR POLYPHASE CURRENTS.

No. 882,682.　　　Specification of Letters Patent.　　Patented March 24, 1908.

Application filed January 21, 1903. Serial No. 140,025.

*To all whom it may concern:*

Be it known that I, ALEXANDER HEYLAND, a subject of the German Emperor, residing and having my post-office address at 32 Rue du Marteau, Brussels, Belgium, have invented certain new and useful Improvements in Commutators for Polyphase Currents, of which the following is a specification.

The purpose of a commutator for polyphase currents is to transform a current of a given periodicity into a current of another periodicity or into a current with a constant direction. In the latter case the periodicity is zero. Existing commutating devices accomplish these results but in a less efficient manner than when the present invention is employed for the reason that the operation of such devices heretofore known has involved current losses which exist throughout the operation as will be hereinafter set forth.

With an ideal polyphase commutator the commutated (transformed) current should be a regular polyphase current, with a periodicity corresponding with the relative speed (slip) of the commutator. The contra E. M. F. and the apparent losses in volt-amperes (not considering the ohmic losses) should increase or decrease in the same ratio as the transformed periodicity.

In the United States Patent No. 510,534 is proposed for this purpose a direct current winding with direct current commutator. With this arrangement I obtain in the direct current winding a polyphase current, the periodicity of which is given by the periodicity of the current in the brushes and the slip of the commutator. The total current in the winding however is not a regular polyphase current. At the moment the brush moves from one commutator segment to the next the current in the section of the winding, which is connected with the two segments, changes in direction. Therefore I get in the separate sections of the windings polyphase currents of a much higher periodicity than the periodicity of the current in the brushes and this periodicity will increase in the same proportion as the number of commutator segments per pole increases. By the rotation of the commutator the current is supplied to or taken from continually changing points of the windings and this is the reason why other polyphase currents circulate in the windings, the periodicity of which is higher than that of the current in the brushes and increases in the same ratio as the number of brushes or the number of phases of the current in the brushes increases. The result is that all these currents with high periodicity produce contra E. M. F., which may become important and prevent a perfect transformation from one periodicity into the other.

In my United States application, Serial No. 93,763 filed Feb. 12, 1902 to obtain a short circuited armature to which, by means of commutator and brushes, single- or polyphase current may be supplied, I proposed to make use of any winding with commutator, the segments of which are connected by means of connections of a certain resistance. The influence of these segment connections is that they suppress all currents of a higher periodicity and therefore every extra contra E. M. F. and that the winding carries really regular polyphase current. These connections however meet with some theoretical and practical disadvantages. They always form a shunt connection with the brushes and therefore cause an inevitable loss of brush current which does not enter into the winding, but finds its way through the segment connections. By certain practical arrangements, for instance: with open windings by certain proportions between the width of segments and brushes, it will be possible to reduce these losses to such an extent, that they do not have an important influence on the efficiency. But they always meet with practical difficulties, especially with multipolar machines with a high number of turns and a high resistance. It is easy to see that the windings divide these segment connections in a number of parallel groups equal to the number of poles of the machine. The resistance of each connection therefore has to increase with the number of parallel groups, *i. e.* with the number of poles of the machine. In many cases this leads to long resistances of small section, the securing of which on the commutator is difficult.

The present arrangement has for its object to avoid both difficulties, and to suppress partly or entirely the segment connections.

In the drawings, Figures 1 to 17 are diagrammatical figures representing different windings and connections as more fully explained hereafter.

The object is to give the winding connected with the commutator the character of a short circuited winding, as for instance a squirrel-cage winding. This is obtained by any arrangement, which avoids the interruption or commutation of the current in the section of the winding between the two segments, as the brushes go from one segment to the other. This result is obtained by alternately closing the sections of the winding connected with the commutator by the main brushes and during the period of interruption of these brushes by auxiliary circuits, which have a certain resistance to avoid a short circuiting during the interruption period, and which work only during the time that the corresponding main brushes are not directly in contact with the commutator segments connected to the windings. During the remaining time these brushes are inactive and it will therefore be possible to reduce to any amount the influence of the shunt connection of this auxiliary circuit.

Generically stated, the invention consists in a commutator comprising electrically insulated sections, to which a winding is connected and current collecting devices bearing upon said commutator, the current collecting devices being so spaced about said commutator with relation to the length of the commutator sections that a section of said commutator to which a winding connection is made will come into connection with one current collecting device before it leaves connection with the preceding one. By this means the winding is continuously connected through the current collecting devices and its circuit is never broken. It is to be understood that the sections of the commutator just referred to may each consist of a single commutator segment or may consist of several commutator segments connected together as by resistances. It is also to be understood that each current collecting device referred to may consist of a single brush or of a plurality of brushes electrically connected together as by resistances.

Fig. 1 represents the former case, as described in my former invention where all the segments are interconnected by the connection $r\ r\ r$. I considered here for its simplicity a bipolar threephase winding with three brushes. The commutator must have at least six segments to avoid a direct short circuit between two brushes. If the winding is only connected with three parts of the commutator I would obtain three intermediate segments, which are not connected with the winding. It will, of course, be possible to connect the winding also with these segments and I obtain then always more segments than brushes. To reduce the time of interruption of the winding section between two segments, as represented in Fig. 1$^b$, it will be suitable to make the width of the brushes nearly the same as the width of the intermediate segments. The time of interruption of the winding $w$ will then be a minimum. In the position Fig. 1$^a$ the winding $w\ w\ w$ is closed at the same time by the brushes 1 2 3 and the segment connections $r\ r\ r\ r$. In position Fig. 1$^b$ the winding, or at least part of it, is only closed by the segment connection $r\ r\ r\ r$ and would be entirely open, if I suppress the segment connections.

Figure 2:
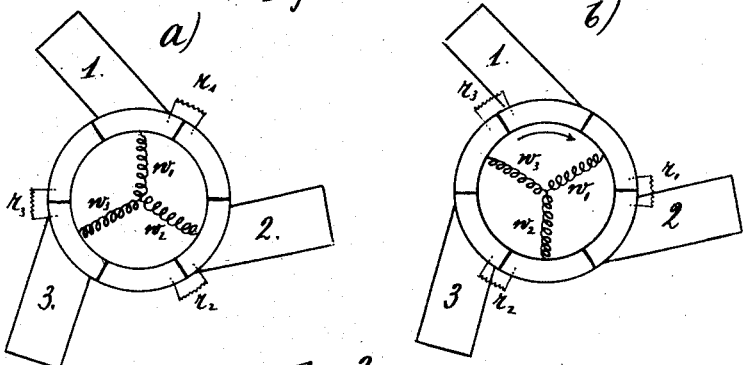
Figure 3:
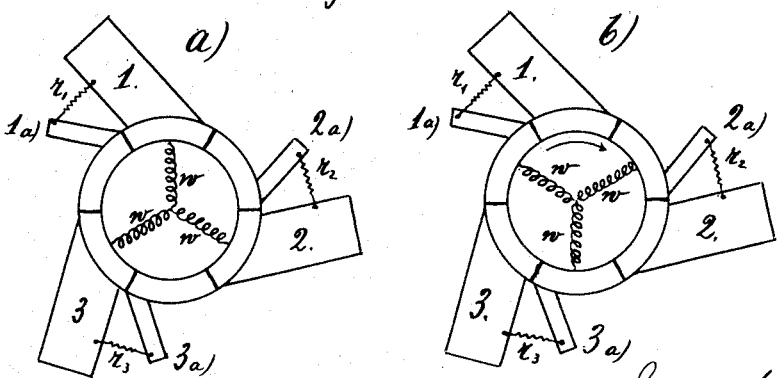
Figure 7:
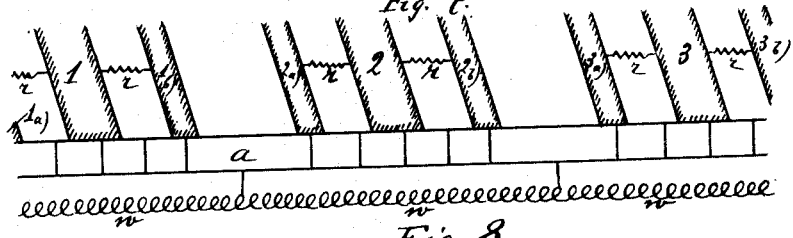
Figure 8:
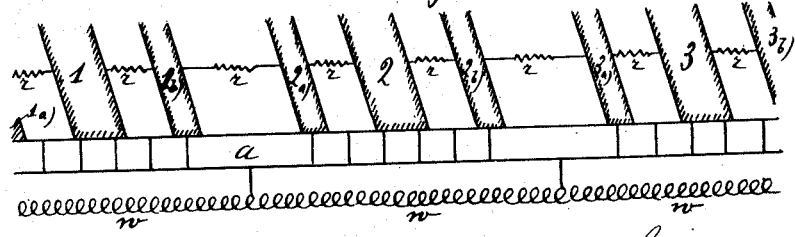

Fig. 2 shows that it is not necessary to connect all the segments, but only so many that the winding sections are constantly directly or indirectly closed and that it will be possible to avoid a constant shunt connection between two brushes. This is represented in Fig. 2. The commutator has only the three connections $r^1\ r^2\ r^3$. In the position $a$ the winding is directly closed by the three brush circuits; in position $b$ by the segment connections and brushes in series: for instance, $w^3$ is closed by $r^3$ and the brush 1, $w^1$ by $r^1$ and brush 2, and $w^2$ by $r^2$ and brush 3. The segment connections form no shunt whatever with the brushes. A shunt connection with the brushes will only exist in the intermediate position between $a$ and $b$, and this moment can be shortened as much as I like by a suitable width of brushes and segments, and—if necessary—by a larger number of segments. Finally it will be possible to suppress these segment connections entirely, if I only take care by other means to keep the winding sections constantly closed. If I do not want to use segment connections, this can be done by three auxiliary brushes, interconnected by means of resistances directly; or indirectly, i. e. connected with the main brushes by means of resistances, as indicated in Fig. 3. Instead of only one set of auxiliary brushes it will be possible to employ two or more sets, as indicated in Figs. 7 & 8, to obtain a most regular working. It is also possible to substitute the main brushes by two or more brushes connected by resistances.

The use of auxiliary brushes to suppress the segment connections has the advantages that the resistances between the brushes, which serve the same purpose as the segment connections before, can be easily fixed and regulated, and fulfil the object of reducing the losses in a perfect way.

The winding is constantly closed, either through the main brushes directly or through the auxiliary resistances, without any short circuit between the brushes. This arrangement is not to be confounded with similar looking ones, where auxiliary segments are, by means of resistances, connected with the main segments of the commutator, or auxiliary brushes are connected, by means of resistances, with the main brushes, for the purpose of avoiding the sparking on the commutator. There the auxiliary resistances are introduced for the purpose that the interruption on the commutator segments connected with the winding may take place gradually. Here the auxiliary circuits formed by the resistances have the opposite object i. e. to avoid the current interruption on the commutator segments connected with the winding. This may be seen from the following fact. With the arrangement to introduce gradually the current interruptions on the commutator the auxiliary segments or brushes follow the rotation with regard to the main segments or main brushes, while with my arrangement they can also be placed in opposite direction, as is indicated for instance in Figs. 2 and 3.

The characteristic feature of the arrangement is the fact that the auxiliary circuits must always be arranged in such way, that they avoid a current interruption on the segments connected with the winding.

For a better understanding I have represented diagrammatically in Figs. 4, 5, 6, 7 & 8 same characteristic positions. $w$ represents in general a winding of any kind, open or closed, ring or drum, or polyphase.

Figure 4:
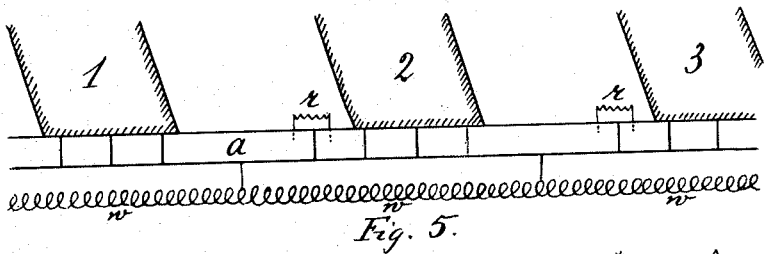

In the position represented in Fig. 4, the current of the segment $a$ can go through the brush 1, as well as through the resistance $r$ and the brush 2. A short-circuit between the brushes 1 and 2 is avoided by the resistance $r$. An instant later the brush 1 leaves the segment $a$ and the current of the segment $a$ flows through the brush 2 only. With further rotation of the commutator the same phenomenon takes place with the segment $a$ and the brushes 2 and 3, etc. etc.

Figure 5:
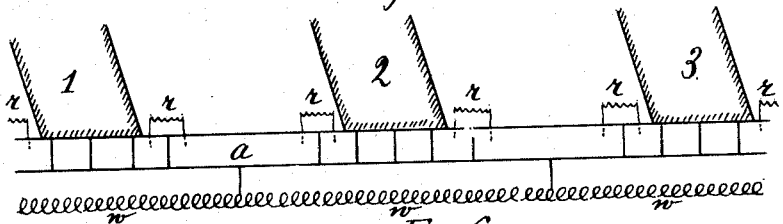

In Fig. 5 the current of the segment $a$ can flow as well through the resistance $r$ (left hand side) and the brush 1, as through the resistance $r$ (right hand side) and the brush 2. The short circuit between the brushes 1 and 2 is avoided by the two resistances $r$ $r$. An instant later the contact of the brush 1 through the resistance $r$ with the segment $a$ is interrupted and the current flows through the brush 2 only. With further rotation the same phenomenon takes place between the segment $a$ and the brushes 2 and 3, etc.

Figure 6:
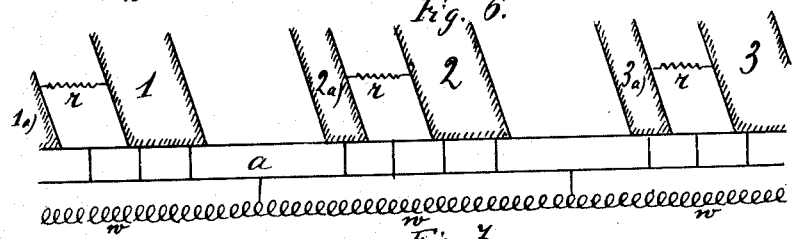

The same phenomena occur with the arrangements in Figs. 6, 7 & 8. Instead of the segment connections $r$ $r$ the brush connections $r$ $r$ are the acting parts.

In a similar manner to that employed in connection with the segment connection, the main brushes may be connected with preceding as well as following auxiliary brushes and if desirable a greater number of auxiliary than main brushes may be employed. Finally it will be possible to connect the same auxiliary brushes with several main brushes, as well as to interconnect partly or entirely all the auxiliary brushes. It will also be possible to subdivide the main brushes into two or a greater number of brushes connected with resistances.

I shall always obtain the same result, that the single commutator segments connected with the winding; i. e. the different winding sections connected to the commutator, are constantly closed by alternately changing circuits.

With multipolar machines it is of course not necessary that the brushes be placed on all the segments connected with the winding and it will be sufficient to interconnect symmetrically placed segments (Mordey connections), in such way, that through these connections the segments connected with the winding are directly or indirectly connected with the brushes.

Figure 9:
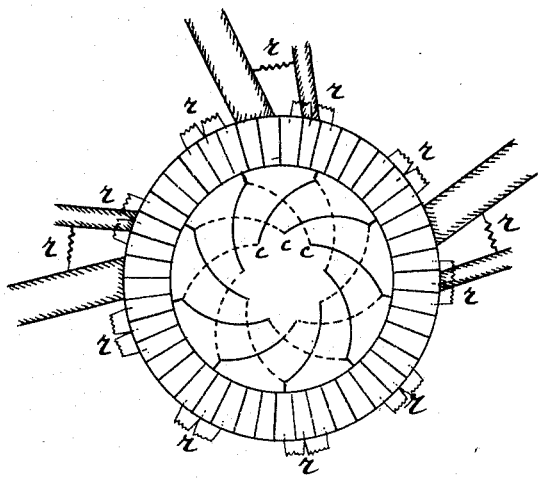
Figure 10:
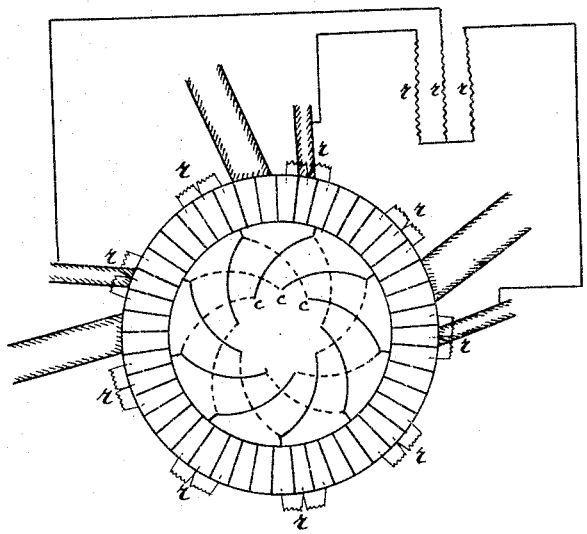

Such a sixpole commutator is for instance represented in Figs. 9 and 10 in which $c$ $c$ $c$ are here the Mordey connections. Both the segment connections as well as the brush connections, are indicated and it will be possible to use these simultaneously, or by means of suitable modifications, suppress the brush connections or the segment connections and use the one or the other alone. The arrangement has a special advantage for machines, as described in my United States application, Serial No. 93763 and has, with regard to the there proposed arrangement, the advantage of making a shortcircuited armature with a constantly closed winding, where constant losses of the brush current can be avoided and where the average short-circuit-resistance of the windings may be much less than was the case in the former arrangement.

Figure 11:
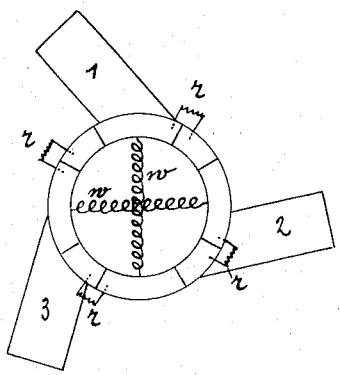
Figure 12:
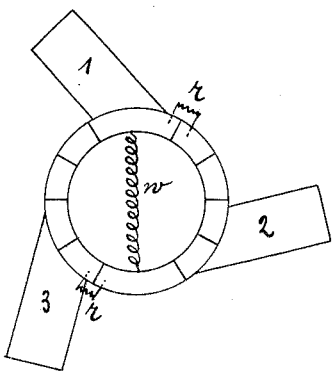
Figure 13:
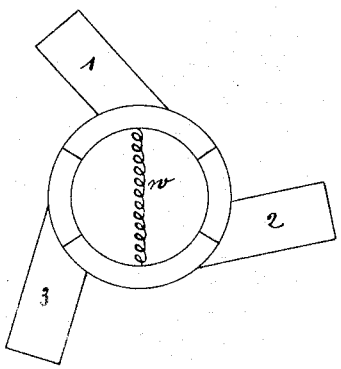
Figure 14:
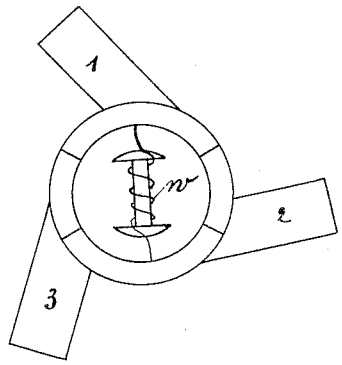
Figure 15:
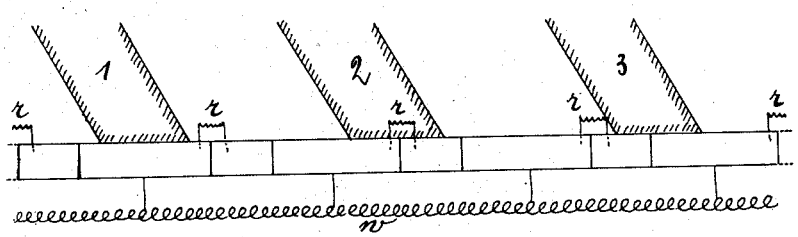
Figure 16:
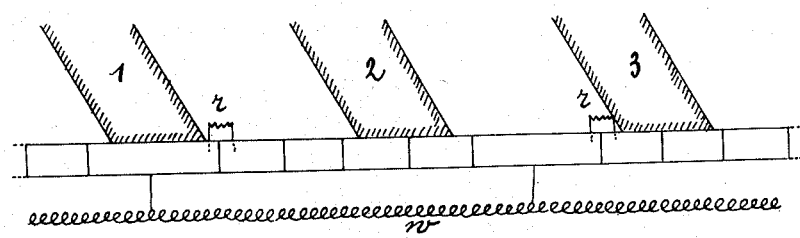
Figure 17:
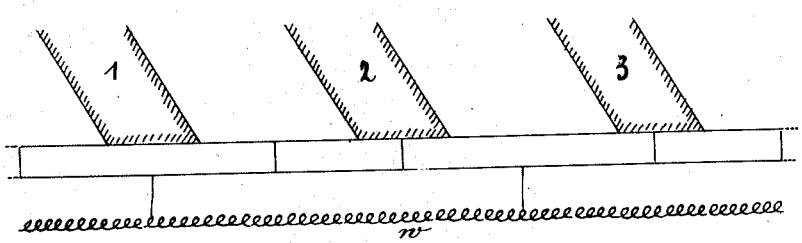

The arrangement can be used as well for transforming polyphase currents into polyphase currents of another periodicity, as well as into a current of constant direction, as well as into singlephase current; in the same way it can be used for the opposite purposes in the described way, as well as by interchanging stationary and moving parts, for the described purpose as well as for other purposes. These four cases are illustrated in Figs. 11, 12, 13, and 14. Fig. 11 shows a commutator for a two phase winding. In Fig. 12 one phase is left out and the transformed current in the winding $w$ will be a single phase alternating current of a lower periodicity. If I make the commutator rotate synchronously, the winding $w$ will carry a current of constant direction (direct current). It will be possible to give the commutator such dimensions, as indicated in Figs. 13 and 14, and it will not be necessary any more to subdivide the commutator as much as before. As the synchronous rotating is a condition for the obtaining of a current of constant direction, it will be easy to adjust the brushes in such a way that, at the very instant that two brushes touch one segment, the pressure between these two brushes—in Figs. 13 and 14 between the brushes 2 and 3—will be zero. Diagrammatically these different combinations are indicated in Figs. 15, 16 and 17. All these modifications are characterized by the fact that the winding connected with the commutator or parts of it are constantly closed in themselves by alternatively changing circuits.

Instead of being placed on the rotor, the windings can be put on the stator in which case the functions of commutator and brushes are reversed. Besides, all the previously known arrangements to avoid sparking at the commutator can be used in connection with the above described arrangement. The wiring can be used for alternating currents of any periodicity and for windings of any polarity.

It will be obvious that the connections of the circuits may be different from that shown in the drawings. Other circuits than the windings of the machine, as for instance the external circuit, may be connected to the commutator while the windings may be connected to the brushes.

Numerous other modifications of the connections of the circuits to the brushes and commutator, which will be readily applied by persons skilled in the art and which do not depart from the spirit of this invention, might be enumerated.

Claims.

1. In a dynamo electric machine, the combination with a commutator comprising electrically insulated sections arranged in the circumference of a circle, of a winding having a plurality of connections to a part only of said sections, and current collecting devices bearing upon said commutator, said current collecting devices being so spaced about said commutator with relation to the length of the said sections that a section of said commutator to which a given winding connection is made, comes into connection with each of said current collecting devices before the connection with the preceding current collecting device is broken.

2. The combination with a commutator, of brushes bearing thereon, means for causing relative movement of said commutator and brushes, circuits connected to a portion of the segments of said commutator, and resistances connecting said circuits to the brushes when the latter bear on segments not connected with said circuits and intermittently connecting segments to which said circuits are connected as the brushes and commutator are relatively moved, substantially as and for the purpose described.

3. The combination with a commutator, of brushes bearing thereon, means for causing relative movement of the commutator and brushes, circuits connected to a portion of the segments of the commutator, and resistances connecting said circuits to the brushes when the latter bear upon segments not connected to said circuits and intermittently connecting said brushes together, substantially as described.

4. The combination with a commutator, of brushes bearing thereon, means for causing relative movement of the commutator and brushes, circuits connected to a portion of the segments of the commutator, and resistances connecting said circuits to said brushes, when the latter are bearing on segments not connected to said circuits, and intermittently connecting the segments with which said circuits are connected.

5. The combination with a commutator, of windings connected thereto, brushes bearing upon the commutator, auxiliary brushes bearing upon the commutator, resistances connected to each pair of main and auxiliary brushes, circuits connected with the main brushes, and means for causing relative movement of the commutator and brushes, the brushes being of such size and so arranged with relation to the commutator that the circuits of said windings are constantly closed through changing brush circuits, substantially as described.

In testimony whereof I have signed my name to this specification in the presence of two subscribing witnesses.

ALEXANDER HEYLAND.

Witnesses:
GREGORY PHELAN,
MAURICE CORBEAU.